United States Patent
Tiirola et al.

(10) Patent No.: US 11,425,697 B2
(45) Date of Patent: *Aug. 23, 2022

(54) DYNAMIC MANAGEMENT OF UPLINK CONTROL SIGNALING RESOURCES IN WIRELESS NETWORK

(71) Applicant: Nokia Technologies Oy, Espoo (FI)

(72) Inventors: Esa Tapani Tiirola, Kempele (FI); Kari Juhani Hooli, Oulu (FI); Timo Erkki Lunttila, Espoo (FI)

(73) Assignee: Nokia Technologies Oy, Espoo (FI)

( * ) Notice: Subject to any disclaimer, the term of this patent is extended or adjusted under 35 U.S.C. 154(b) by 71 days.

This patent is subject to a terminal disclaimer.

(21) Appl. No.: 16/637,442

(22) PCT Filed: Aug. 11, 2017

(86) PCT No.: PCT/EP2017/070464
§ 371 (c)(1),
(2) Date: Feb. 7, 2020

(87) PCT Pub. No.: WO2019/029823
PCT Pub. Date: Feb. 14, 2019

(65) Prior Publication Data
US 2020/0221444 A1   Jul. 9, 2020

(51) Int. Cl.
*H04L 12/50* (2006.01)
*H04W 72/04* (2009.01)
*H04L 1/18* (2006.01)
*H04W 72/12* (2009.01)

(52) U.S. Cl.
CPC ....... *H04W 72/0413* (2013.01); *H04L 1/1812* (2013.01); *H04W 72/1284* (2013.01)

(58) Field of Classification Search
CPC .................................................. H04L 12/50
USPC ................................................... 370/412
See application file for complete search history.

(56) References Cited

U.S. PATENT DOCUMENTS

2014/0362792 A1  12/2014  Cheng et al.
2015/0098406 A1   4/2015  Miao et al.
2016/0338041 A1  11/2016  Li et al.
(Continued)

OTHER PUBLICATIONS

"On Resource Allocation for PUCCH and Multiplexing PUCCH Formats", Ericsson, 3GPP TSG-RAN WG1 NR Ad-Hoc#2, R1-1711494, Qingdao, China, Jun. 27-30, 2017, 6 pgs.
(Continued)

*Primary Examiner* — Dang T Ton
(74) *Attorney, Agent, or Firm* — Harrington & Smith

(57) ABSTRACT

A technique includes receiving, by a user device from a base station, a first message indicating a plurality of sets of uplink control channel resources for the uplink transmission of a type of uplink control information, each set of uplink control channel resources having a resource configuration; receiving, by the user device from the base station, a second message that is different from the first message, the second message indicating a selected uplink control channel resources, of the plurality of sets of uplink control channel resources, for the uplink transmission of a type of uplink control information; and sending, by the user device to the base station, uplink control information via the selected set of uplink control channel resources.

22 Claims, 9 Drawing Sheets

(56) References Cited

U.S. PATENT DOCUMENTS

2021/0195577 A1* 6/2021 Wu ..................... H04W 72/02

OTHER PUBLICATIONS

"On the Resource Allocation for PUCCH", Nokia, Alcatel-Lucent Shanghai Bell, 3GPP TSG RAN WG1 NR Ad-Hoc #2, R1-1710898, Qingdao, P.R. China, Jun. 27-30, 2017, 2 pgs.

* cited by examiner

DYNAMIC MANAGEMENT OF UPLINK CONTROL SIGNALING RESOURCES IN WIRELESS NETWORK

CROSS REFERENCE TO RELATED APPLICATION

This patent application is a U.S. National Stage application of International Patent Application Number PCT/EP2017/070464 filed Aug. 11, 2017, which is hereby incorporated by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the Long Term Evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. A goal of 5G is to provide significant improvement in wireless performance, which may include new levels of data rate, latency, reliability, and security. 5G NR may also scale to efficiently connect the massive Internet of Things (IoT), and may offer new types of mission-critical services.

SUMMARY

According to an example implementation, a method includes determining, by a base station, a plurality of sets of uplink control channel resources for uplink transmission of a type of uplink control information, each set of uplink control channel resources having a resource configuration; sending, by the base station to a user device, a first message indicating the plurality of sets of uplink control channel resources; selecting, by the base station, one set of the plurality of sets of uplink control channel resources; sending, by the base station to the user device, a second message that is different from the first message, the second message indicating the selected set of uplink control channel resources for uplink transmission of a type of uplink control information; and receiving, by the base station from the user device, uplink control information via the selected set of uplink control channel resources.

According to an example implementation, an apparatus includes at least one processor and at least one memory including computer instructions, when executed by the at least one processor, cause the apparatus to: determine, by a base station, a plurality of sets of uplink control channel resources for uplink transmission of a type of uplink control information, each set of uplink control channel resources having a resource configuration; send, by the base station to a user device, a first message indicating the plurality of sets of uplink control channel resources; select, by the base station, one set of the plurality of sets of uplink control channel resources; send, by the base station to the user device, a second message that is different from the first message, the second message indicating the selected set of uplink control channel resources for uplink transmission of a type of uplink control information; and receive, by the base station from the user device, uplink control information via the selected set of uplink control channel resources.

According to an example implementation, an apparatus includes means for determining, by a base station, a plurality of sets of uplink control channel resources for uplink transmission of a type of uplink control information, each set of uplink control channel resources having a resource configuration; means for sending, by the base station to a user device, a first message indicating the plurality of sets of uplink control channel resources; means for selecting, by the base station, one set of the plurality of sets of uplink control channel resources; means for sending, by the base station to the user device, a second message that is different from the first message, the second message indicating the selected set of uplink control channel resources for uplink transmission of a type of uplink control information; and means for receiving, by the base station from the user device, uplink control information via the selected set of uplink control channel resources.

According to an example implementation, a computer program product includes a computer-readable storage medium and storing executable code that, when executed by at least one data processing apparatus, is configured to cause the at least one data processing apparatus to perform a method including: determining, by a base station, a plurality of sets of uplink control channel resources for uplink transmission of a type of uplink control information, each set of uplink control channel resources having a resource configuration; sending, by the base station to a user device, a first message indicating the plurality of sets of uplink control channel resources; selecting, by the base station, one set of the plurality of sets of uplink control channel resources; sending, by the base station to the user device, a second message that is different from the first message, the second message indicating the selected set of uplink control channel resources for uplink transmission of a type of uplink control information; and receiving, by the base station from the user device, uplink control information via the selected set of uplink control channel resources.

According to an example implementation, a method includes receiving, by a user device from a base station, a first message indicating a plurality of sets of uplink control channel resources for the uplink transmission of a type of uplink control information, each set of uplink control channel resources having a resource configuration; receiving, by the user device from the base station, a second message that is different from the first message, the second message indicating a selected set of uplink control channel resources, of the plurality of sets of uplink control channel resources, for the uplink transmission of a type of uplink control information; and sending, by the user device to the base station, uplink control information via the selected set of uplink control channel resources.

According to an example implementation, an apparatus includes at least one processor and at least one memory including computer instructions, when executed by the at least one processor, cause the apparatus to: receive, by a user device from a base station, a first message indicating a plurality of sets of uplink control channel resources for the uplink transmission of a type of uplink control information, each set of uplink control channel resources having a resource configuration; receive, by the user device from the base station, a second message that is different from the first message, the second message indicating a selected set of uplink control channel resources, of the plurality of sets of uplink control channel resources, for the uplink transmission of a type of uplink control information; and send, by the user device to the base station, uplink control information via the selected set of uplink control channel resources.

According to an example implementation, an apparatus includes means for receiving, by a user device from a base station, a first message indicating a plurality of sets of uplink control channel resources for the uplink transmission of a type of uplink control information, each set of uplink control channel resources having a resource configuration; means for receiving, by the user device from the base station, a second message that is different from the first message, the second message indicating a selected set of uplink control channel resources, of the plurality of sets of uplink control channel resources, for the uplink transmission of a type of uplink control information; and means for sending, by the user device to the base station, uplink control information via the selected set of uplink control channel resources.

According to an example implementation, a computer program product includes a computer-readable storage medium and storing executable code that, when executed by at least one data processing apparatus, is configured to cause the at least one data processing apparatus to perform a method including: receiving, by a user device from a base station, a first message indicating a plurality of sets of uplink control channel resources for the uplink transmission of a type of uplink control information, each set of uplink control channel resources having a resource configuration; receiving, by the user device from the base station, a second message that is different from the first message, the second message indicating a selected set of uplink control channel resources, of the plurality of sets of uplink control channel resources, for the uplink transmission of a type of uplink control information; and sending, by the user device to the base station, uplink control information via the selected set of uplink control channel resources.

The details of one or more examples of implementations are set forth in the accompanying drawings and the description below. Other features will be apparent from the description and drawings, and from the claims.

DETAILED DESCRIPTION

Figure 1:
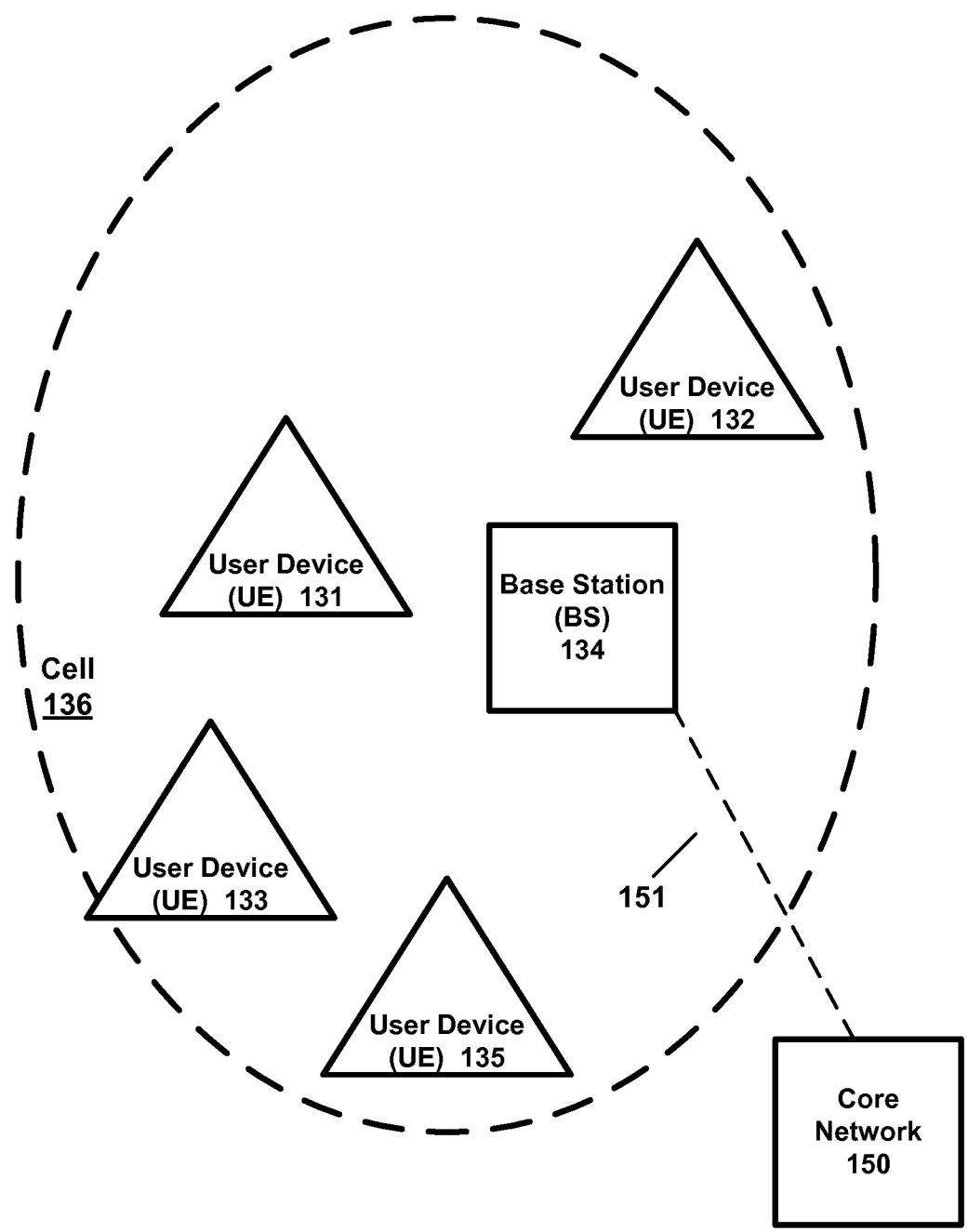
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB, or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), wireless relaying including self-backhauling, D2D (device-to-device) communications, and ultra-reliable and low-latency communications (URLLC). Scenarios may cover both traditional licensed band operation as well as unlicensed band operation.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability)

The various example implementations may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

As noted, different data service types (or different types of UEs) may have different performance requirements, such as for reliability (e.g., maximum block error rate), bandwidth or data throughput or minimum data rate, and latency. Some data service types, such as eMBB, may require higher data rates, while tolerating higher block error rates and higher latency (as compared to URLLC). On the other hand, some high reliability data service types, such as URLLC, may require much higher reliability (e.g., lower block error rates) and lower latency, as compared to eMBB. On the other hand, they may operate with relatively small transport blocks sizes (i.e. smaller data throughput) compared to typical eMBB services.

By way of illustrative example, a user device (or UE) may send and/or receive mixed data traffic, or send and/or receive data of multiple data service types. For example, a UE may include two applications running thereon, including: 1) a URLLC application (e.g., an autonomous or self-driving car related application) that requires high reliability/low latency services and 2) an eMBB application (e.g., web browser, email application, social media application) that does not require high reliability/low latency services. It may be desirable, at least in some cases, to perform at least some level coordination of the sending and/or receiving data, control information and other functions performed by these different data service types of the UE.

According to an example implementation, a non-high reliability (e.g., eMBB) data service type (or eMBB application) on a UE may transmit uplink control information via a long physical uplink control channel (PUCCH) format length, while a high reliability/low latency (e.g., URLLC) data service type (or URLLC application) on the UE may transmit uplink control information via a short physical uplink control channel (PUCCH) format length (e.g., to allow for quicker or more frequent transmission of control information). Thus, in some cases, a longer PUCCH format may be used to allow more data/control information to be sent over a period of time (e.g., for eMBB data service type), while a shorter PUCCH format may be used to allow for a quicker transmission of uplink control information in the case where a shorter latency (e.g., such as for transmission of HARQ feedback) may be required (such as for URLLC data service type). Although, in another example implementation, the eMBB or non high reliability data service types (such as eMBB and others) may also use a short PUCCH format length.

Uplink control information (UCI) may generally include, for example one or more of: a scheduling request (SR) that the UE may send to request uplink resources for transmission, a hybrid automatic repeat request (HARQ) feedback, e.g., HARQ Acknowledgement/ACK to acknowledge receipt of data, or HARQ negative acknowledgement/NAK to negatively acknowledge data (e.g., indicate that data was not received); and/or channel state information (CSI feedback, which may include, e.g., a rank indication (RI), a precoder matrix indication (PMI), and/or a channel quality indication (CQI)). Also, reference signals, such as sounding reference signal (SRS) and/or demodulation reference signals (DMRS), may be transmitted by a UE, and may be used by a BS to perform channel sounding and/or estimation and then decode received signals or data from the UE.

According to an example implementation, in New Radio (NR) (5G) frame structure design, both slot and mini-slot may be supported. The duration of a slot may be either 7 or 14 symbols depending on the subcarrier spacing of the used numerology. Furthermore, slot aggregation may be configured at least for eMBB service. The possible durations of a mini-slot may at least include 1 or 2 OFDM (orthogonal frequency division multiplexing) symbols.

Figure 2:
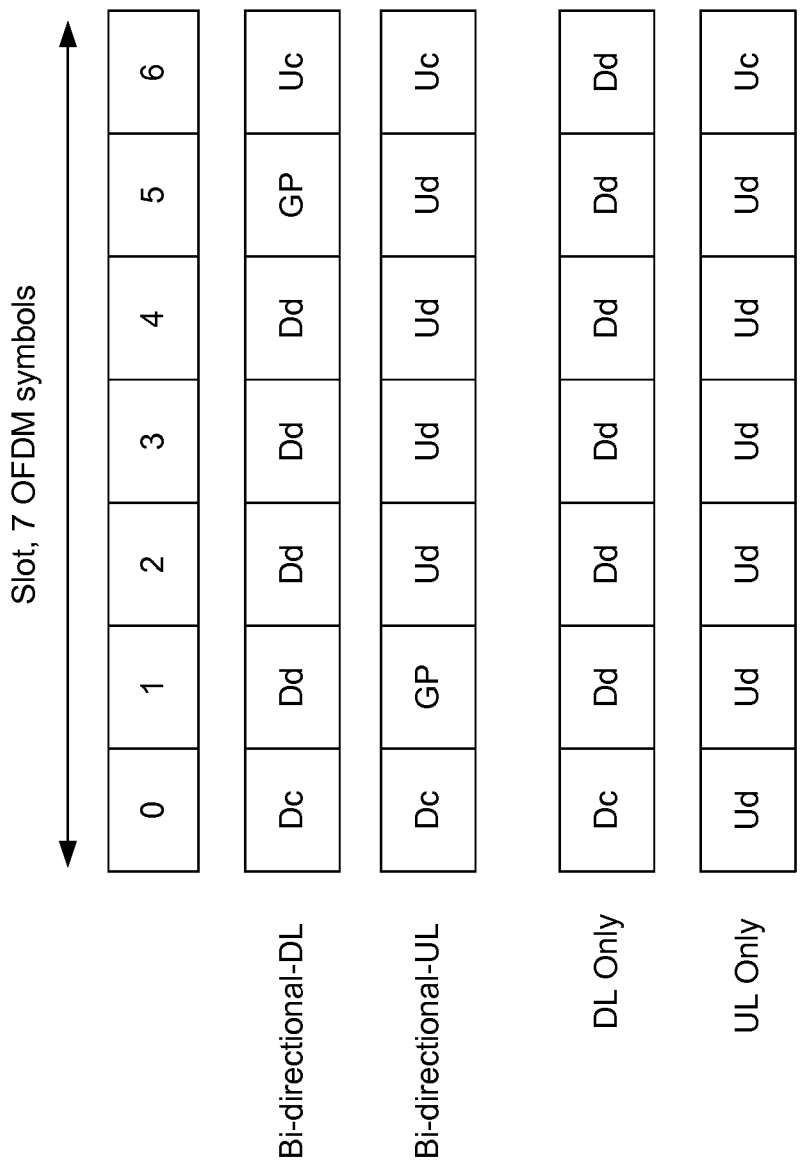
FIG. 2 is a diagram illustrating some slot types according to an example implementation.

FIG. 2 is a diagram illustrating some slot types according to an example implementation. Symbols are shown for each slot type, with Dc referring to downlink control information, Dd referring to downlink data, GP referring to a guard period, Uc referring to uplink control information, and Ud referring to uplink data. For example, there may be several slot types, as shown in FIG. 2, that provide the basic support for both TDD (time division duplexing) and FDD (frequency division duplexing). For the bi-directional slots, there is either downlink data or uplink data transmission in each slot, as well as the corresponding downlink and uplink control. Bi-directional slot may facilitate many TDD functionalities in the NR frame structure, such as, e.g., link direction switching between DL and UL, fully flexible traffic adaptation between DL and UL, and opportunity for low latency, provided that slot length is selected to be short enough.

In all slots of FIG. 2, multiplexing between DL control, DL/UL data, GP and UL control may be based, for example, primarily on time division multiplexing allowing fast energy efficient pipeline processing of control and data in the receiver. Physical Downlink Control Channel (PDCCH) may be conveyed in the DL control symbol(s) located at the beginning of the slot (or the mini-slot). However, the option of PDCCH and PDSCH multiplexing in frequency domain is not excluded. Additionally, frequency domain multiplexing (FDM) of long PUCCH and PUSCH is supported. FDM is supported also between short PUCCH and PUSCH, as well as between short PUCCH and long PUCCH at least when the physical channels are transmitted by different UEs.

In addition to bi-directional slots, there are also DL-only slot and UL-only slot in FIG. 2. These slot types may be needed at least in FDD mode, but also in certain TDD scenarios to allow longer transmission periods in same direction.

According to an example implementation, there can be multiple mini-slots in a slot, and different UEs can be scheduled in different mini-slots. Two main scenarios that benefit from mini-slots are latency reduction and unlicensed band operation. Especially, e.g., when 15 kHz subcarrier spacing is used, mini-slot may provide advantages over slot based transmission. Furthermore, mini-slots may also be a way to provide time multiplexing between different UEs when operating at high carrier frequencies (with higher subcarrier spacing) and when using RF beamforming architecture. Depending on the system operation point (e.g., offered traffic), the use of a mini-slot for lower air interface latency is useful not only for URLLC, but also for some eMBB applications (e.g. for quickly overcoming slow start TCP/transmission control protocol) procedures.

A mini-slot may be used, for example, to support URLLC—with strict delay requirements, which may require small scheduling granularity in time. If a packet is scheduled using a slot, e.g., for HARQ ACK feedback (FB), the delay (between data and HARQ FB for such data) may be 1 or 2 or 3 slots later, for example, which is a substantial delay that may not be tolerated by URLLC. For mini-slots, HARQ FB may be scheduled or transmitted much quicker, e.g., later in same slot that data was received, or in the next slot, which may better accommodate a strict delay requirements for URLLC, for example.

Figure 3A:
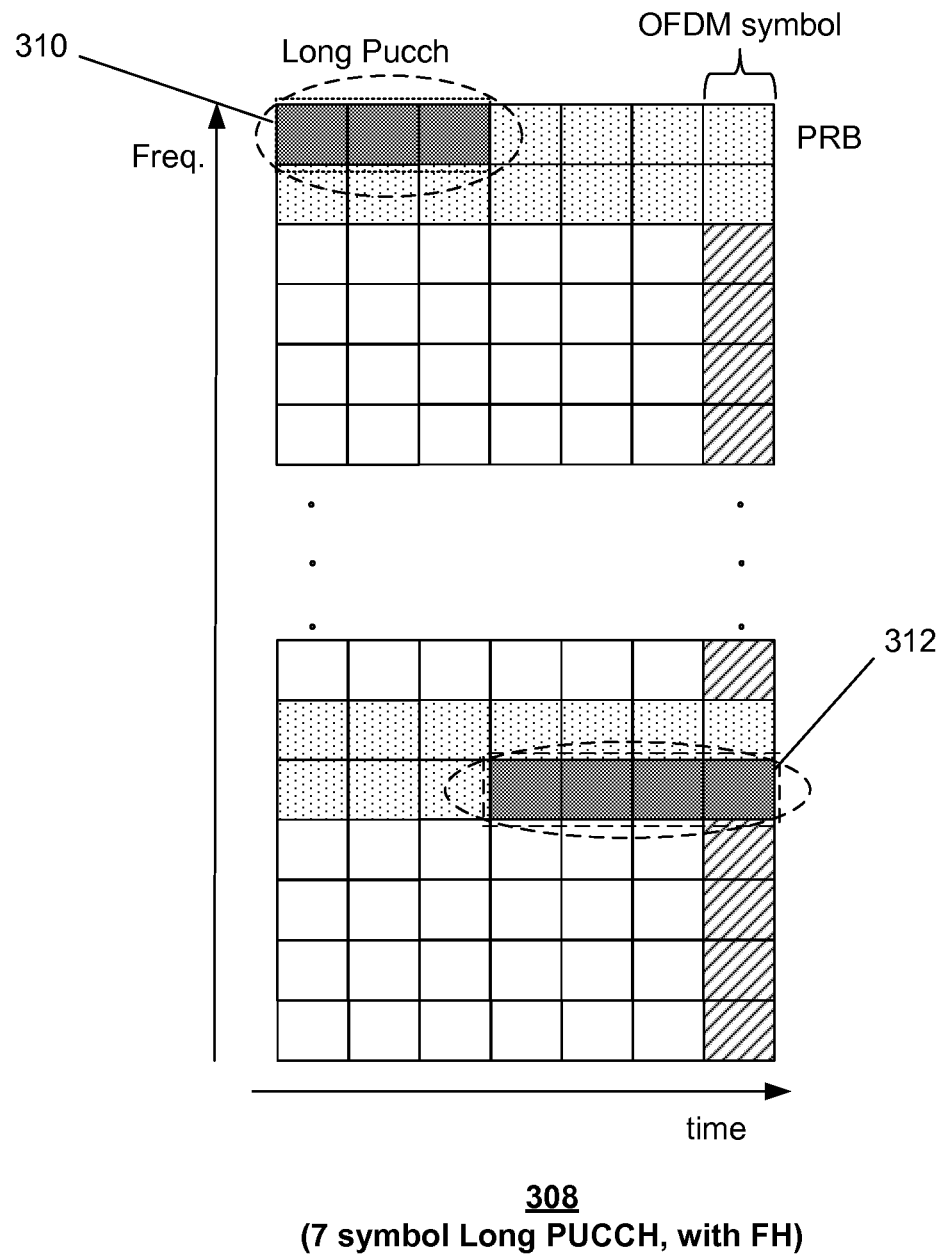
FIG. 3A is a diagram illustrating a long physical uplink control channel (PUCCH) format according to an example implementation.
Figure 3B:
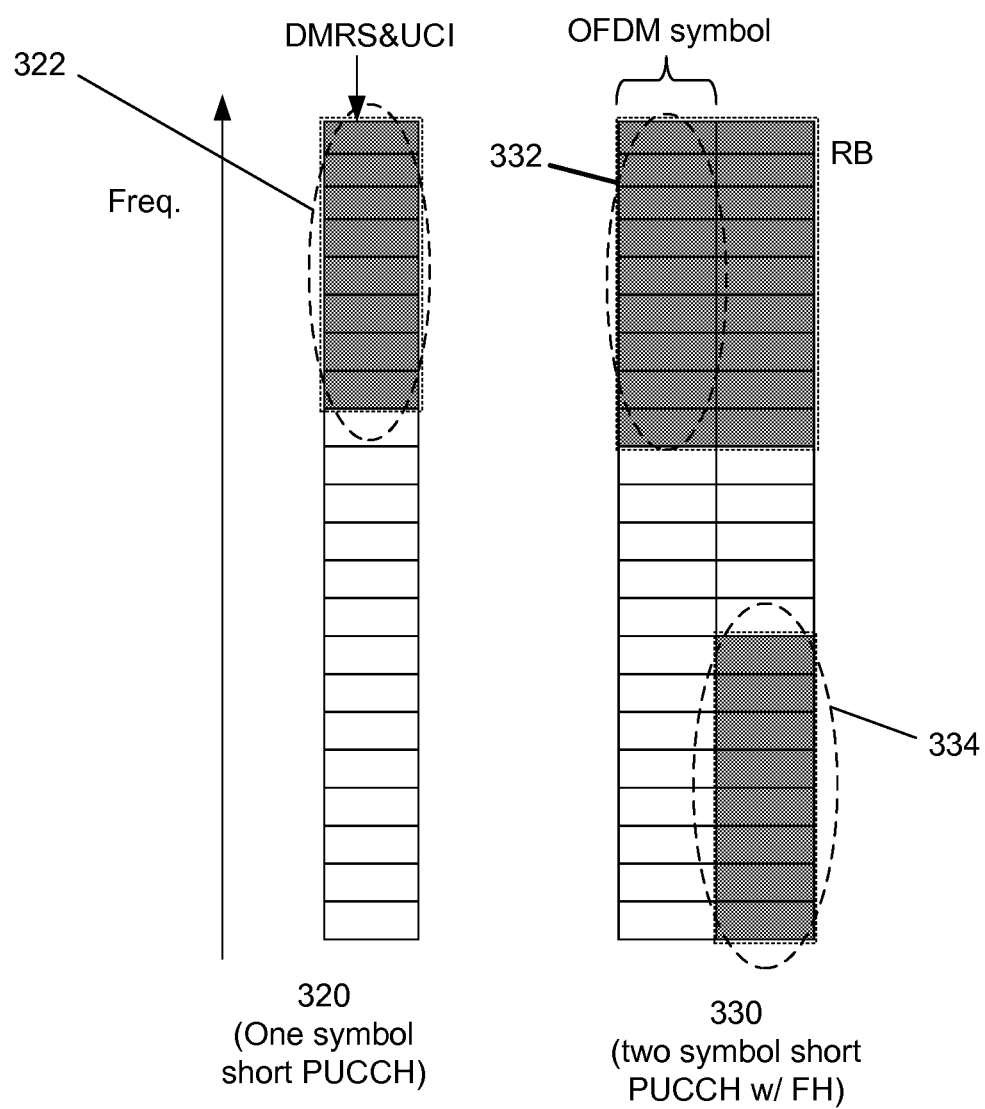
FIG. 3B is a diagram illustrating a short physical uplink control channel (PUCCH) format according to an example implementation, for both one symbol and two symbols.

FIG. 3A is a diagram illustrating a long physical uplink control channel (PUCCH) format according to an example implementation. FIG. 3B is a diagram illustrating a short physical uplink control channel (PUCCH) format according to an example implementation, for both one symbol and two symbols.

Referring to FIG. 3A, an example long PUCCH 308 of 7 symbols (e.g., same length in time as an example slot) is shown, as an illustrative example. Long PUCCH 308 may include, by way of example, a first group 310 of three OFDM symbols of a first physical resource block (RB or PRB, which may include a set of subcarriers), e.g., within the first row, and then a second group 312 of four additional OFDM symbols of a different PRB (e.g., within the ninth row), where each PRB (or physical resource block) may include or indicate a different frequency or different set of subcarriers, for example. For example, a first symbol of each of the groups 310 and 312 of symbols may include DMRS (e.g., to allow a BS to perform channel estimation and decode received uplink data or information), and the remaining symbols of each group 310 and 312 may include uplink control information such as HARQ feedback, or Channel State Information (CSI) reports, for example. The number of DMRS symbols per slot and their location may vary according to scenario or PUCCH configuration (e.g. according to UCI payload). By having a long PUCCH 308 include a group 310 of symbols within a first PRB (the first row) and a group 312 of symbols within another row (e.g., the ninth row), this long PUCCH 308 employs frequency hopping (FH) to provide increased frequency diversity for the long PUCCH format. The long PUCCH shown in FIG. 3A may provide a low PAPR/CM (peak to average power ratio or cubic metric), e.g., when using DFT-S-OFDM (discrete Fourier transform spread orthogonal frequency division multiplexing) based waveform. CP-OFDM (cyclic prefix orthogonal frequency division multiplexing) may be supported as another waveform option for long PUCCH.

Referring to FIG. 3B, an example short PUCCH 320 of 1 symbol is shown, as an illustrative example, and may include a group 322 of PRBs within one OFDM symbol. Similarly, a two symbol short PUCCH 330 uses frequency hopping, and may include a first group 332 of PRBs (physical resource blocks) within a first OFDM symbol, and a second group 334 of PRBs within a second OFDM symbol, for example.

A short PUCCH may be optimized to facilitate low latency and it supports also UL control signaling via bi-directional DL slot, for example, and a PUCCH variant that is related to mini-slot may be based on the short PUCCH structure. Frequency domain multiplexing between RS (reference signals, such as demodulation reference signals) and UCI (uplink control confirmation) is supported. Frequency diversity on short PUCCH may be provided based on frequency hopping, clustered transmission or scheduled transmission, depending on the scenario of interest.

A UE may transmit different types of uplink control information (UCI), such as a scheduling request (SR), a channel state information (CSI) and/or hybrid automatic repeat request (HARQ or HARQ-ACK) feedback. Also, a BS may allocate resources to a UE for transmitting these different UCI.

Furthermore, various network conditions may change over time, such as, for example, traffic load, an amount of data that may be at a cell/BS awaiting transmission to the UE (thus, impacting the amount of HARQ feedback that the UE may need to transmit to the BS), a number of user devices that are connected or active on a cell or network, an amount of interference and/or radio channel conditions (e.g., a lower signal-to-interference plus noise ratio (SINR)) may require more resources to be assigned to the UE to transmit the same amount of UCI, e.g., due to a lower modulation and/or coding scheme (MCS), a need to more efficiently organize or compress the PRBs used by a UE for UCI transmission (e.g., based on a changing number of active UEs, some PRBs used for uplink control channels may be compressed, or network may allocated fewer PRBs for UCI, so as to free up other PRBs for other purposes such as for uplink data transmission, for example), or other network conditions.

According to an example implementation, a BS may configure a plurality of sets of uplink control channel resources for the transmission of UCI, with each set having a resource configuration (e.g., a different resource configuration). As described in greater detail below, the BS may send a message to the UE to indicate a selected set of uplink control channel resources (out of the plurality of sets of uplink control channel resources) that should be used by the UE (or which has been allocated to the UE) to send or transmit UCI (e.g., one type of UCI) to the BS. Thus, for example, a set of uplink control channel resources may be selected by the BS for use by the UE in order to adapt or adjust the uplink control channel resources allocated to the UE based on a network condition.

According to an example implementation, a base station (BS) may configure or determine a plurality of sets of uplink control channel resources that may be used by a UE for transmitting a type of uplink control information (UCI), such as for transmitting a scheduling request (SR), a channel state information (CSI) and/or hybrid automatic repeat request (HARQ) feedback. Rather than using a single set of uplink control channel resources for the transmission of UCI (which may be relatively inflexible), multiple sets of uplink control channel resources may be configured by a BS for possible use by the UE to transmit a type of UCI (e.g., SR, CSI or HARQ feedback), where each set of uplink control channel resources may have a (e.g., different) resource configuration. Different resource sets may include different PUCCH resources for certain UCI type allocated on different PRBs. Different resource sets may contain also different PUCCH resource types for certain UCI type. For example, different resource sets of uplink control channel resources may use either a short PUCCH or a long PUCCH, may use a different PUCCH formats, may have a different number of resources (e.g., a different number of physical resource blocks/PRBs and/or OFDM symbols, a different number of subcarriers, . . . ), e.g., in order to accommodate different situations or use cases. A number of different resource configuration parameters may be varied among the different sets of uplink control channel resources that may be configured for a UE to use for uplink transmission. Each set of uplink control channel resources may include one or more resources. Also, a different plurality of sets of uplink control channel resources may be configured for a UE for multiple types of UCI, e.g., for SR, CSI and HARQ feedback. In this manner, different uplink control channel resources may be configured for a UE for different types of UCI.

For example, some resource set(s) of the uplink control channel resources may use a short PUCCH and/or have fewer resources, e.g., to accommodate a network condition that may require less UCI and/or to provide a short latency for UCI feedback, to allow for greater compression of resource elements for the UCI (UCI transmitted via fewer resource elements). In other cases, a resource set(s) may have a set of uplink control channel resources that may use a long PUCCH or may use more resources, e.g., to accommodate a need by the UE to send more UCI (e.g., a need of the UE to send more HARQ feedback based on a large amount of data that has been sent or is waiting to be sent to the UE) or to accommodate a need to transmit UCI over more challenging radio channel (e.g., having a larger path loss). A number of different configuration parameters maybe vary or be different amount the resource sets for the plurality of sets of uplink control channel resources. Thus, for example, a set of uplink control channel resources, out of a plurality of sets of uplink control channel resources having different resource configurations, may be allocated to a UE, e.g., in order to adapt or adjust the uplink control channel resources based on a network condition, for example.

For example, for CSI and SR, each set of uplink control channel resources may include one resource, whereas for HARQ feedback, each set of uplink control channel resources may include multiple resources. For example, a BS may configure, for a UE, e.g., four sets of one resource for transmitting a scheduling request (SR), where one or more of the sets (or each set) of resources may have a different resource configuration (e.g., at least one configuration parameter that is different). The BS may also configure four sets of one resource for transmitting CSI, where one or more of the sets (or each set) of resources may have a different resource configuration. And, the BS may also configure, for the UE, e.g., four sets of four resources for transmitting HARQ feedback. Generally speaking, the number of the resource sets configured by the BS, as well as number of resources within each set may vary according to the scenario as well as the UCI type.

According to an example implementation, a BS may determine a plurality of sets of uplink control channel resources (e.g., which have been configured for the UE for possible use for uplink transmission) for uplink transmission of a type of uplink control information, each set of uplink control channel resources having a resource configuration. In some cases, one or more sets (or each set) may have a different resource configuration which may include one or more different configuration parameter(s), such as including either a short PUCCH or a long PUCCH, and other configuration parameters. The BS may send a first message (e.g., a radio resource control (RRC) message) indicating the plurality of sets of uplink control channel resources. The BS may select (e.g., based on a network condition) one set of the plurality of sets of uplink control channel resources. The BS may send to the user device a second message that is different from the first message, the second message indicating the selected set of uplink control channel resources for uplink transmission of a type of uplink control information (e.g., for uplink transmission of either SR, CSI or HARQ feedback). For example, the second message may be a MAC control element sent by the BS to the UE, which may allow the BS to dynamically change (e.g., during a PDU session or connection to a UE, based on a changing network condition) a selected set of uplink control channel resources). The BS may then receive from the user device uplink control information transmitted via the selected set of uplink control channel resources. Also, for example, the first message (or other information provided to the UE) may also indicate a default set of the plurality of sets of uplink control channel resources that may be used by the UE to send or transmit UCI to the BS before the UE receives the second message that indicates a selected set of the plurality of sets of uplink control channel resources for the transmission of UCI.

According to another example implementation, a UE (or user device) may receive, from a BS, a first message indicating a plurality of sets of uplink control channel resources for the uplink transmission of a type of uplink control information, each set of uplink control channel resources having a resource configuration. The UE may receive, from the BS, a second message that is different from the first message, the second message indicating a selected set of uplink control channel resources, of the plurality of sets of uplink control channel resources, for the uplink transmission of a type of uplink control information. And, the UE may send, to the BS, uplink control information via the selected set of uplink control channel resources.

A number of further example implementations and details will now be described. According to an example implementation, a dynamic allocation of PUCCH resources may be configured. This may be done based on a MAC (medium access control) level re-configuration/selection of a set of PUCCH resources. Those resources can be, e.g., periodically used resources (such as SR, Periodic CSI, HARQ-ACK) that may have been configured and allocated to the UE via RRC.

Resources (a plurality of sets of PUCCH resources) can include also a plurality of sets of HARQ-ACK resources configured via RRC, and with one of the sets of PUCCH resources selected for use by the UE. The BS may indicate the selected set of PUCCH resource for HARQ feedback via MAC control element, e.g., to allow dynamic selection/reconfiguration of the set of PUCCH resources. As noted, one resource within the selected PUCCH resources for HARQ feedback may be signaled to UE via downlink control information (DCI), for example. MAC level re-configuration/selection may be done separately for short PUCCH and long PUCCH. Configuration may be done separately for each UCI type. Each resource set (or plurality of sets of PUCCH resources) may contain short PUCCH resource(s), long PUCCH resource(s) or both. The re-configuration may also indicate the PUCCH type (short PUCCH or long PUCCH) to be used for the associated UCI type. Similarly, for each of SR and CSI, a plurality of sets of PUCCH resources may be configured and then indicated to a UE via RRC message. For each of SR and CSI, one of the sets of the plurality of uplink control channel (e.g., PUCCH) resources may be selected by the BS, and the BS may indicate the selected set of PUCCH resources (or selected PUCCH resource) to the UE via MAC control element, for example. For example, RRC messages may be relatively slow (and may contain considerable signaling overhead). Therefore, to allow a dynamic (e.g., during a connection, or in response to a change in a network condition), a MAC control element may be used by a BS to indicate to a UE a new selected set of uplink control channel (e.g., PUCCH) resources configured for the UE for UL transmission of a type of UCI (e.g., for transmission of either SR, CSI or HARQ feedback). DCI may also be used, for example, to indicate a selection of one resource within the selected set of PUCCH resources, e.g., for HARQ-ACK (HARQ feedback).

According to an example implementation, a RRC message may be used to configure (e.g., indicate to UE) a plurality of sets of PUCCH resources for UL (uplink) transmission, for each of one or more UCI types. For example, the RRC message may indicate (or identify) the plurality of sets of PUCCH resources configured for a UCI type by indicating one or more parameters for (each or all) of the plurality of sets of PUCCH resources configured for the UE. In an example implementation, each set of PUCCH resources of a plurality of PUCCH resources configured for a UE may include a different configuration (e.g., may include one or more parameters that may be different from another PUCCH set), such as for example, one or more of the following: 1) For one or more PUCCH resource sets, each set includes PUCCH resources from different PRBs (e.g., which may support PUCCH compression according to actual PUCCH load); 2) For one or more PUCCH resource sets, a set of PUCCH resources may include PUCCH resources from different slots (for CSI and SR—may also indicate the SF (subframe) index or mini-slot index); might also be used for ACK/NACK. or symbols (this allows for balancing the PUCCH load between different slots/mini-slots/subframes or, in the case of 1-symbol short PUCCH, between 2 symbols possibly reserved for short PUCCH); 3) For one or more PUCCH resource sets, a PUCCH resource set contains PUCCH resources comprising different amount of resource elements (e.g., this may allow for adjusting the PUCCH resource size and, correspondingly, UCI code rate, to changing radio conditions); 4) For one or more PUCCH resource sets, a base station (BS) may also change the periodicity of the resource set/allocation (e.g., based on the actual data transmission profile); 5) For one or more PUCCH resource sets, a BS may also change the contents/format of the UCI fed back from UE to BS, such as the CSI reporting mode, or the type of HARQ-ACK feedback (e.g., transport block or code block based feedback, bundling of HARQ-ACK bits, HARQ-ACK codebook size, i.e., the number of HARQ-ACK bits, or other change in UCI format; 6) Different resources in a PUCCH resource set may be associated with different CSI reporting modes, or HARQ-ACK contents.

According to an example implementation, a RRC configuration of a plurality of sets of PUCCH resources for a UE may also include a default set of PUCCH resource that may be used by the UE to send uplink control information (UCI) (for transmission of uplink control information, such as SR, CSI or HARQ feedback) to the BS after the UE receives the RRC message that provides the plurality of sets of PUCCH resources (e.g., and an indication of the default set of PUCCH resources) and before the MAC control element has been received by the UE that indicates a selected set of PUCCH resources for uplink transmission of a type of UCI. Thus, for example, the default PUCCH parameter set, which may be indicated or signaled within the RRC message that indicates the plurality of sets of PUCCH resources for the UE (or other signal or message) may be used by the UE to send UCI after RRC configuration after been completed (but before the $1^{st}$ MAC level re-configuration is made by BS). Alternatively, UE may use cell specific resources until the $1^{st}$ MAC level re-configuration is received by UE. This approach may be used, e.g., for HARQ-ACK, or other type of UCI. For example, before any MAC CE (MAC control element, or a first message) is received by UE, the first PUCCH resource set (e.g., of the 4 PUCCH resource sets indicated via RRC for the UE) may be used as a default PUCCH resource set, and this PUCCH resource set may be changed or reconfigured by a MAC CE (a second message). A default set of PUCCH resources (out of the plurality of PUCCH resources sets configured via RRC for the UE) may be used for any or all of the UCI types, e.g., a first default PUCCH resource/resource set (out of a first set of four PUCCH resource sets) to be used by UE to transmit SR, a second default PUCCH resource/resource set (out of a second plurality of resources/resource sets) to be used by UE to transmit CSI, and a third default PUCCH resource set (out of a third set of four PUCCH resource sets) to be used by UE to transmit HARQ ACK (HARQ feedback). Thus, for example, there may be no need to send any MAC CEs to change the selected PUCCH resource set if the default (e.g., first) resource set is sufficient. Thus, for example, a BS may send a MAC Control Element (CE) to the UE change the selected PUCCH resource for transmission of UCI, e.g. based on the dynamic variation of PUCCH circumstances.

According to an example implementation, when the utilization of periodic PUCCH resources reduces, the BS can compress the PUCCH resources into fewer PRBs (to have more resources available for PUSCH data). For example, a BS may select PUCCH resources with 4 short PUCCHs; or a resource set with fewer PRBs/resources, compressing PUCCH resources more compact. For example, there may be no need to allocate large HARQ feedback resources if they are not needed, or not used. For example, it may be desirable, in some cases, to allocate as few as possible PUCCH resources for HARQ ACK, and allow more resources for UL data. And, as network conditions may change, a BS may allocate a PUCCH resource set (e.g., by sending a new MAC CE to the UE indicating the new PUCCH resource set) with more resources (e.g., more PRBs, or more subcarriers), e.g., to allow UE to send more HARQ feedback, or to use link adaptation to provide more robust modulation/coding rate for HARQ feedback, as this may typically require more PUCCH resources to send same amount of HARQ feedback, for example. Thus, the BS, based on a changing network condition, may send a new MAC control element to a UE to identify a new PUCCH resource set that has a configuration (e.g., more resource, or less resources, long PUCCH or short PUCCH, or other parameters) that may be adjusted based on the network condition. One the other hand, if control channel load increases on certain PRBs (in the neighboring cells), the BS may re-arrange the PUCCH UEs/PRB (to keep the interference level reasonable). Also, for example, a BS may also balance the PUCCH load between different slots/mini-slots or symbols reserved for short PUCCH.

According to an example implementation, an operation of a BS and/or UE may include multiple parts of phases, such as one or more of the following parts of phases:

1) Configuration, cell common part (e.g., configuring cell-specific UL control signaling space, a portion of which may be allocated to each UE): this provides the logical channel space for UL control signaling separately for different control signaling types/channels. This may be done based on higher layer signaling, such as RRC. There may be a common configuration for cell—where PUCCH resources are located, and each UE may be given a subset of PUCCH resources. BS would allocate a cell-specific resource space for PUCCH signals.

2) Configuration, UE dedicated part: this provides set(s) of resources separately for different control signaling types (such as SR, HARQ-ACK, periodic CSI—these different UCI typically would have different resources, to avoid collisions in many cases. Configuration may also include a default channel to be used when RRC configuration has been completed. Configuration may include also include other parameters, such as periodicity, transmit (Tx) power related parameters, and so forth. This may be done based on higher layer signaling, such as RRC. For example, a BS may select 4 (UE-specific) sets of PUCCH resources for each UE (e.g., selects 4 sets of 4 resources each) for a UCI type, e.g., for HARQ (ACK/NACK) feedback. For example, BS may send a radio resource control (RRC) message to a UE to indicate a plurality of sets of PUCCH resources configured for the UE for a type of UCI transmission (e.g., where one of these PUCCH resource sets may be used by UE for UCI transmission, as either the default PUCCH resources set, or a selected PUCCH resource set that is selected for use by the UE for UCI transmission and indicated to the UE via a MAC control element).

3) Dynamic operation: UE receives PDSCH (physical downlink shared channel) which includes a MAC control element (MAC CE), which may indicate a selected PUCCH resource set to be used by the UE for UCI transmission for a type of UCI. Thus, for example, in part 2), RRC signaling may be used by BS to configure the parameters for the plurality of possible PUCCH resource sets/PUCCH configurations for each UCI type, and then at part 3) the BS may dynamically select one PUCCH configuration/PUCCH resource set for a UCI type by sending a MAC CE over the PDSCH to UE. A single MAC CE may relate to one or more UCI types and the corresponding PUCCH resource set(s).

Tables 1-3 below indicate different configurations for an example plurality of (e.g., four) PUCCH resource sets, for SR (Table 1), CSI (Table 2) and HARQ feedback (Table 3). Each table includes examples of parameters that may be changed or varied to provide a group (plurality) of PUCCH resource sets (or sets of resources) for a UE, which may accommodate different network conditions (e.g., including both short PUCCH, and long PUCCH, and other varying parameters). The BS may then select one PUCCH resource set of the plurality of (e.g., four) PUCCH resource sets, e.g., based on network conditions or other factors or criteria. Thus, for example, Tables 1-3 below show a few possible examples of how various aspects of PUCCH resources can be reconfigured with MAC CEs (e.g., to select a different PUCCH resource set, of the four configured PUCCH resource sets for a UE, for example). In the examples below, for each case (SR, CSI and HARQ feedback), a plurality (or group) of PUCCH resources includes four different PUCCH resource configurations (four different sets of PUCCH resources, each having a different resource configuration). According to an example implementation, one or more parameters of each of the four configured sets of PUCCH resources for a UE may be configured or indicated via RRC signaling, and then a MAC CE is used for selecting which of the PUCCH resource sets (or PUCCH resource configurations) to apply (indicating which PUCCH resource set/resource configuration the UE should use to transmit the indicated type of UCI).

Each table lists a set of example configuration parameters that may describe the PUCCH resources for the different PUCCH resource sets/resource configurations, including one or more of the following example parameters (these are merely some example parameters, and other parameters may be used for resource sets/resource configurations):

A PUCCH (physical uplink control channel) type as either a short PUCCH or a long PUCCH.

A number of physical resource blocks (PRBs)—this may indicate a size of the PUCCH resource.

An indication of a starting physical resource block, e.g., may correspond to the frequency location of the PUCCH resource.

An indication of a resource within PRBs—this may relate to code division multiplexing (CDM) or frequency division multiplexing (FDM) within the PRB. CDM usage may include, e.g., different cyclic shifts and/or orthogonal cover codes.

A periodicity and slot offset for PUCCH.

A duration of PUCCH.

A channel state information (CSI) reporting mode for PUCCH—indicates CS reporting mode to be used by UE to report CSI via the PUCCH.

A maximum payload for PUCCH.

A timing within a slot—e.g., a short PUCCH may cover the last symbol of the slot, and the second to last symbol, or both, for example.

TABLE 1

An exemplary set of four PUCCH resource sets (or resource configurations) for Scheduling Request (SR):

| Channel | # of PRBs | starting PRB | resource within PRB(s) | periodicity and slot offset | timing within a slot | duration |
|---|---|---|---|---|---|---|
| PUCCH short resource PUCCH set #1 | 2 | PRB x | resource 1 | 1 | 1st short PUCCH symbol | 1 |
| PUCCH short resource PUCCH set #2 | 4 | PRB y | resource k | 5, offset 0 | N/A | 2 |
| PUCCH long resource PUCCH set #3 | 1 | PRB w | resource m | 10, offset 5 | N/A | 4 |
| PUCCH long resource PUCCH set #4 | 1 | PRB z | resource n | 5, offset 2 | N/A | 14 |

TABLE 2

An exemplary set of four PUCCH resource sets (or PUCCH resource configurations) for Channel State Information (CSI):

| | Channel | PUCCH format | # of PRBs | starting PRB | resource within PRB(s) | periodicity and slot offset | timing within a slot | CSI duration | reporting mode | maximum payload |
|---|---|---|---|---|---|---|---|---|---|---|
| PUCCH resource set #1 | short PUCCH | N/A | 6 | PRB x | resource l | 5, offset 4 | 1st short PUCCH symbol | 1 | wide band CSI | 10 |
| PUCCH resource set #2 | short PUCCH | N/A | 4 | PRB y | resource k | 10, offset 4 | N/A | 2 | frequency selective CSI | 30 |
| PUCCH resource set #3 | long PUCCH | medium | 1 | PRB w | resource m | 15, offset 7 | N/A | 4 | frequency selective CSI | 20 |
| PUCCH resource set #4 | long PUCCH | large | 2 | PRB z | resource n | 10, offset 2 | N/A | 14 | frequency selective CSI | 50 |

TABLE 3

An exemplary set of four PUCCH resource sets (or PUCCH resource configurations) for HARQ-ACK feedback:

| | Channel | PUCCH format | # of PRBs | starting PRB | resource within PRB(s) | timing within a slot | HARQ ACK feedback duration | HARQ-ACK feedback mode | HARQ-ACK codebook size | maximum payload |
|---|---|---|---|---|---|---|---|---|---|---|
| PUCCH resource set #1 | short PUCCH | N/A | 6 | PRB x0, x1, x2, x3 | resource l1, l1, l2, l3 | 1st short PUCCH symbol | 1 | code block group based | adaptive | 10 |
| PUCCH resource set #2 | short PUCCH | N/A | 4 | PRB y0, y1, y2, y3 | resource k0, k1, k2, k3 | N/A | 2 | transport block based | fixed (maximum) | 15 |
| PUCCH resource set #3 | long PUCCH | medium | 1 | PRB w0, w1, w2, w3 | resource m0, m1, m2, m3 | N/A | 4 | code block group based | adaptive | 20 |
| PUCCH resource set #4 | long PUCCH | large | 2 | PRB z0, z1, z2, z3 | resource n0, n1, n2, n3 | N/A | 14 | code block group based | adaptive | 50 |

Figure 4:
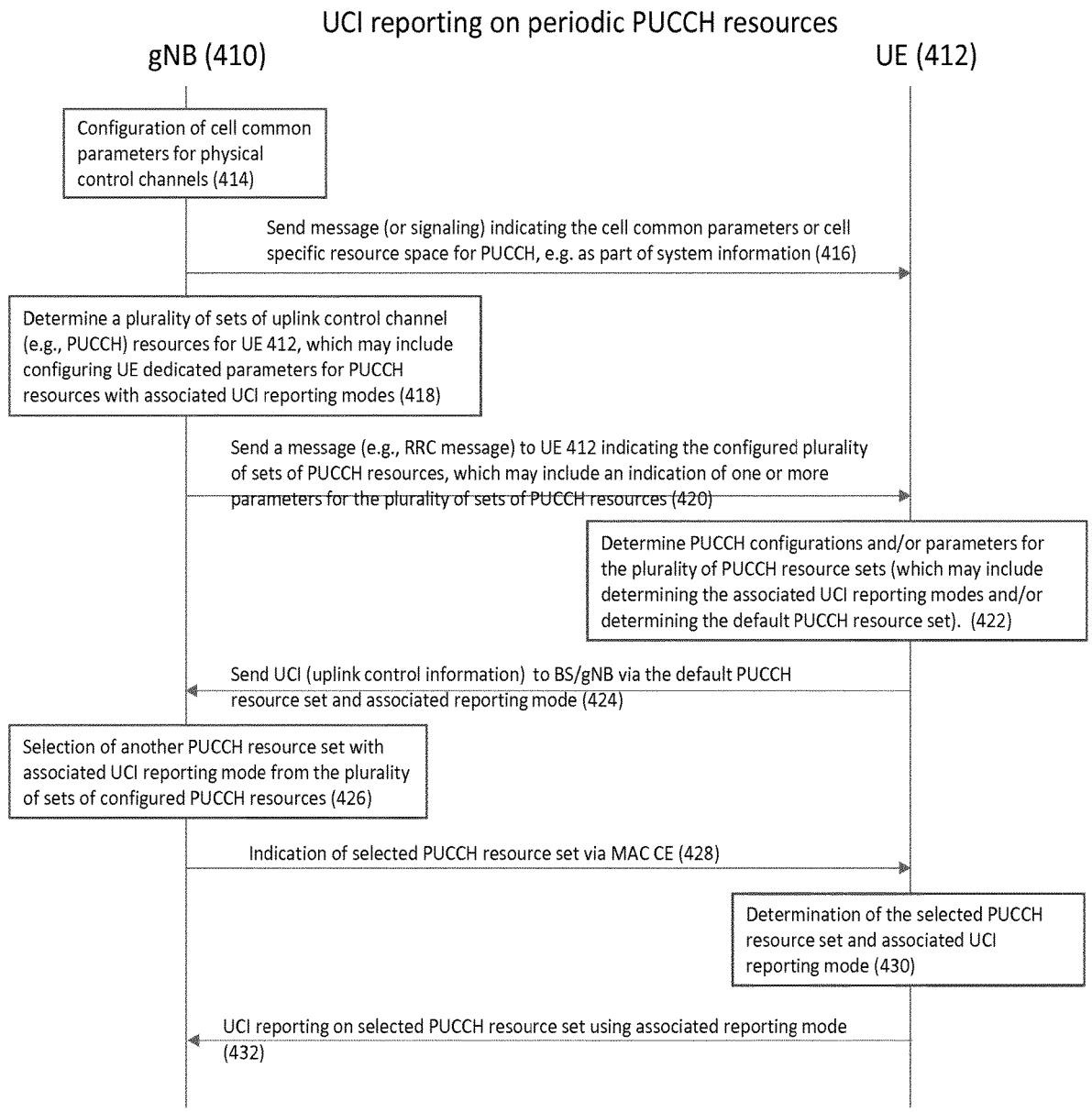
FIG. 4 is a signal diagram illustrating uplink control information reporting on periodic uplink control channel resources according to an example implementation.

FIG. 4 is a signal diagram illustrating uplink control information reporting on periodic uplink control channel resources according to an example implementation. In FIG. 4, a BS (gNB) 410 is in communication with a UE (user device) 412. At 414, the BS configures cell common parameters for PUCCH resources, e.g., resource space for the cell for PUCCH resources is configured.

At 416, the BS 410 sending a message to UE 412 indicating the cell common parameters or cell specific resource space for PUCCH, for example. This may be done, e.g., as part of system information or using RRC signaling. In some scenarios operation 416 may be combined into or with operation 420.

At 418, the BS 410 determines a plurality of sets of uplink control channel (e.g., PUCCH) resources for UE 412, which may include configuring UE dedicated parameters for PUCCH resources with associated UCI reporting modes. UCI reporting modes may include different modes or formats that may be used for reporting different uplink control information, which for CSI may include different CSI reporting modes, and for HARQ feedback may include different HARQ feedback formats (e.g., 1 bit or 2 bits for HARQ feedback) and/or whether the HARQ feedback is transport block based, code block group based, and which HARQ ACK/NACK bundling option is selected, etc.

At 420, the BS 410 sends a message (e.g., RRC message) to UE 412 indicating the configured plurality of sets of PUCCH resources, which may include an indication of one or more parameters for the plurality of sets of PUCCH resources, for example. The message or signaling at 420 may also indicate a default set of PUCCH resources (e.g., which the UE 412 may use for transmitting UCI to BS 410 until a subsequent selection of a PUCCH resource set/PUCCH resource configuration is received by the UE 412). The indication may be implicit (e.g. first configuration contained in the message at 420) or explicit. By way of illustrative example, the use of a default resource set (which may include a default resource within the default PUCCH resource set) may be skipped or may be omitted, under some example implementations.

At 422, the UE 412 determines PUCCH configurations and/or parameters for the plurality of PUCCH resource sets (which may include determining the associated UCI reporting modes and/or determining the default PUCCH resource set).

At 424, the UE may send UCI (uplink control information) via the default PUCCH resource set and associated reporting mode.

At 426, the BS 410 selects a (or another) PUCCH resource set (of the plurality of PUCCH resource sets indicated to UE via message at 420). At 428, the BS 410 may send a message (e.g., MAC control element) that indicates the selected PUCCH resource set (selected PUCCH resource configuration or parameter(s) thereof).

At 430, the UE 412 receives or determines the selected PUCCH resource set and associated UCI reporting mode.

At 432, the UE 412 may send UCI to the BS 410 via the selected PUCCH resource set and associated reporting mode.

Figure 5:
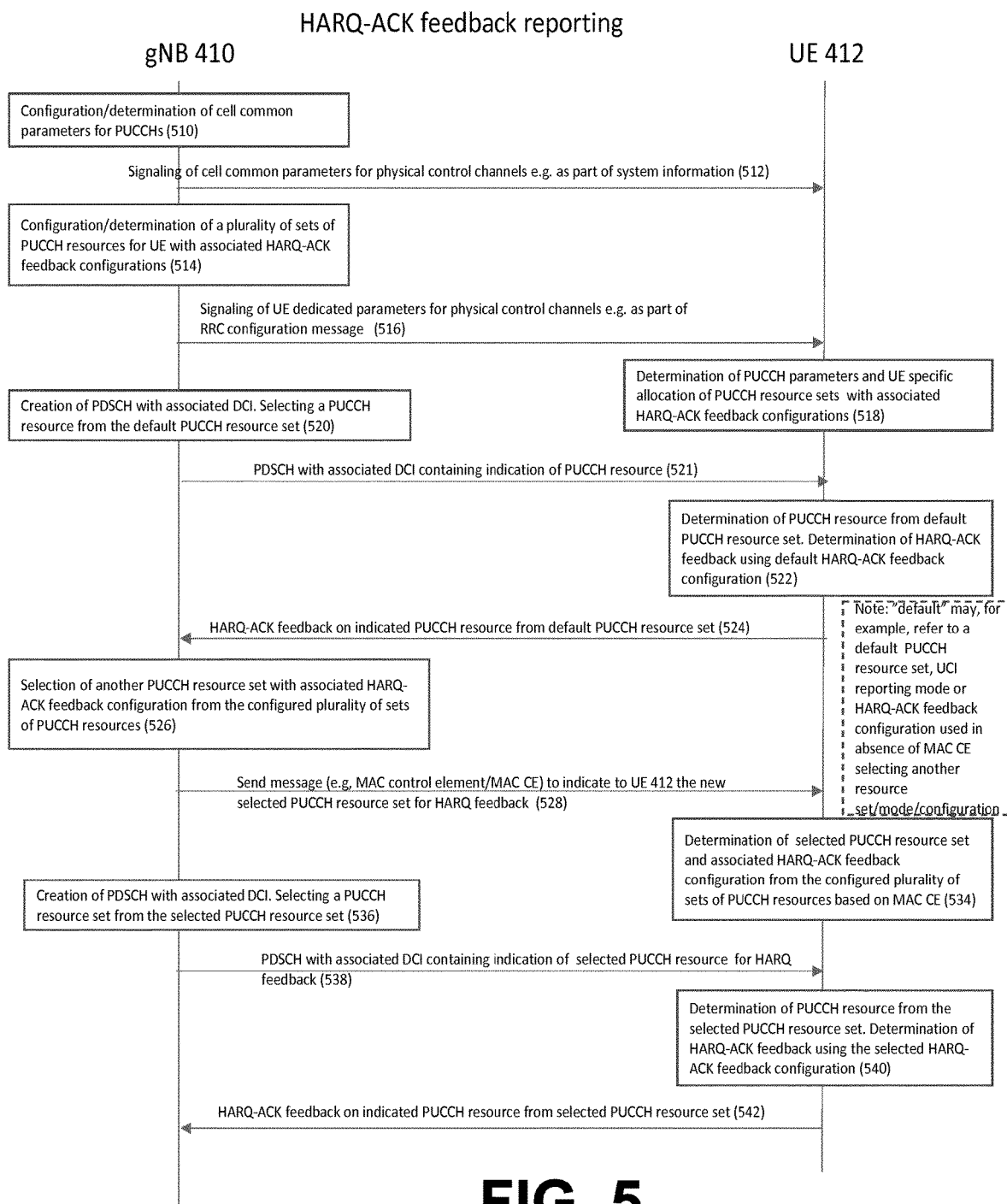
FIG. 5 is a signal diagram illustrating HARQ feedback reporting on uplink control channel resources according to an example implementation.

FIG. 5 is a signal diagram illustrating HARQ feedback reporting on uplink control channel resources according to an example implementation. In FIG. 5, a BS (gNB) 410 is in communication with a UE (user device) 412. At 510, the BS 410 configures cell common parameters for PUCCH resources, e.g., resource space for the cell for PUCCH resources is configured.

At 512, the BS 410 sending a message to UE 412 indicating the cell common parameters or cell specific resource space for PUCCH, for example.

At 514, the BS 410 determines/configures a plurality of sets of uplink control channel (e.g., PUCCH) resources for UE 412 for HARQ feedback, including associated HARQ feedback modes/configuration. For example, HARQ feedback modes/configuration may include different HARQ feedback formats (e.g., 1 bit or 2 bits for HARQ feedback) and/or whether the HARQ feedback is transport block based, code block group based, and which HARQ ACK/ NACK bundling option is selected, etc.

At 516, the BS 410 sends a message (e.g., RRC message) to UE 412 indicating the configured plurality of sets of PUCCH resources for HARQ feedback (e.g., including HARQ feedback modes/configurations). Also, in an example implementation, the message or signaling at 516 may also indicate a default set of PUCCH resources for HARQ feedback (e.g., which the UE 412 may use for transmitting HARQ feedback to BS 410 until a subsequent selection of a PUCCH resource set/PUCCH resource configuration for HARQ feedback is received by the UE 412). The indication may be implicit (e.g. first configuration contained in the message at 516) or explicit. By way of illustrative example, the use of a default resource set may be skipped or may be omitted, under some example implementations.

At 518, the UE determines the plurality of (configured) PUCCH resource sets for HARQ feedback and any associated HARQ feedback modes or configurations for each configured PUCCH resource set. This is done based on messages at 512 and 516.

At 521, the BS 410 may send, via downlink control information (DCI) to UE 412, an indication of a selection of one resource within the selected set of PUCCH resources for the UE for HARQ feedback. Thus, while message at 516 (RRC message) indicates a plurality of PUCCH resource sets that are configured for the UE for HARQ feedback (which may include a default PUCCH resource set for HARQ feedback), the DCI via message at 521 may indicate a selected or default resource within the default PUCCH resource set that should be used by UE to report HARQ feedback (e.g., DCI information indicating that resource 1 should be used for HARQ feedback, out of 5 resources within the default PUCCH resource set). At 522, the UE 412 determines the selected or default PUCCH resource within the selected PUCCH resource set that should be used for HARQ feedback.

At 524, the UE 412 sends HARQ feedback on the indicated resource (indicated at 521) within the default PUCCH resource set for HARQ feedback.

At 526, BS 410 may select another (e.g., a different) PUCCH resource set (out of the plurality of PUCCH resource sets for HARQ feedback), e.g., based on a change to one or more network conditions. At 528, the BS 410 sends a message, e.g., a MAC control element, to indicate to UE 412 the new selected PUCCH resource set for HARQ feedback. The message at 528 may be contained on PDSCH with associated DCI. The BS 410 may indicate via DCI a selected resource within the default PUCCH resource set for HARQ feedback. The UE 412 may send HARQ feedback to BS 410 for message via the resource within the default PUCCH resource set from the plurality of PUCCH resource sets.

At 534, the UE 412 may determine a new selected PUCCH resource set for HARQ feedback based on (MAC CE) message at 528.

At 536, the BS 410 may create a PDSCH with associated DCI, and then select a new PUCCH resource. At 538, the BS may send DCI indicating the new selected resource within the new PUCCH resource set for HARQ feedback. At 540, the UE 412 may determine a PUCCH resource from the new selected PUCCH resource set, and determine a HARQ feedback using the selected HARQ feedback configuration. At 542, the UE 412 may send HARQ feedback to the BS via the new resource within the new selected PUCCH resource set from the plurality of PUCCH resource sets.

Some example advantages may include, by way of illustrative example:

1) The amount of RRC (radio resource control) signaling between UE and BS may be reduced, which may provide less control signaling overhead.

2) PUCCH capacity can be divided evenly between different slots/symbols/PRBs in spite of changing network load or interference, which may reduce UL (uplink) control signaling overhead.

3) More robust PUCCH operation since gNB/BS may reduce the PUCCH load on certain PRBs in dynamic manner (e.g., based on faster MAC CE messages, and/or without involving or relying upon slow/expensive RRC re-configuration messages).

4) UE specific PUCCH configuration may be adapted to the changing network conditions, such as changing network load, interference conditions, radio conditions, numbers of UEs, without need for RRC signaling.

5) possible reduced implementation complexity.

Example 1

Figure 6:
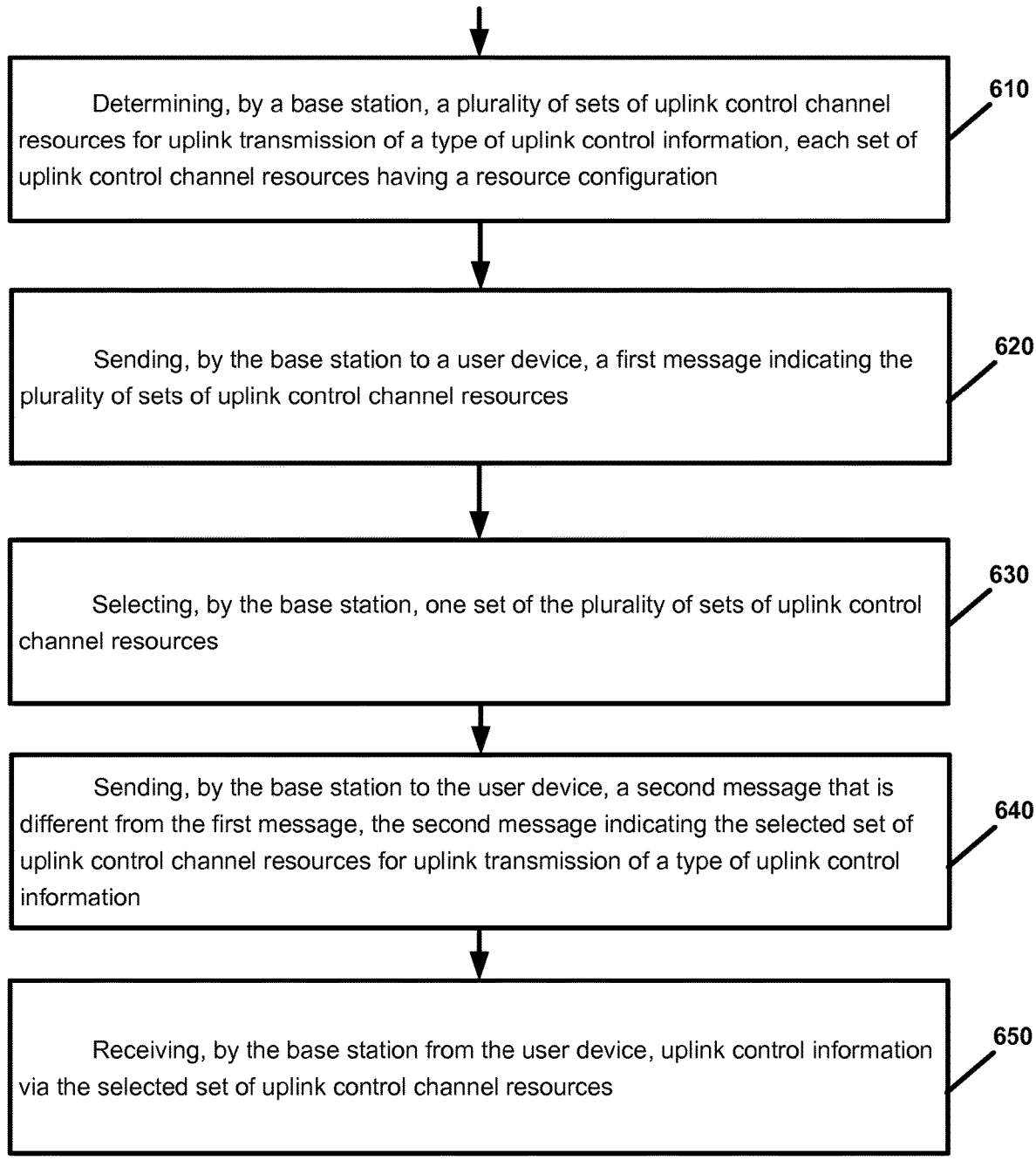
FIG. 6 is a flow chart illustrating operation of a base station according to an example implementation.

FIG. 6 is a flow chart illustrating operation of a base station according to an example implementation. Operation 610 includes determining, by a base station, a plurality of sets of uplink control channel resources for uplink transmission of a type of uplink control information, each set of uplink control channel resources having a resource configuration. Operation 520 includes sending, by the base station to a user device, a first message indicating the plurality of sets of uplink control channel resources. Operation 630 includes selecting, by the base station, one set of the plurality of sets of uplink control channel resources. Operation 640 includes sending, by the base station to the user device, a second message that is different from the first message, the second message indicating the selected set of uplink control channel resources for uplink transmission of a type of uplink control information. Operation 650 includes receiving, by the base station from the user device, uplink control information via the selected set of uplink control channel resources.

Example 2

According to an example implementation of example 1, wherein each set of uplink control channel resources has a different resource configuration.

Example 3

According to an example implementation of any of examples 1-2, wherein each set of the plurality sets of uplink control channel resources includes one or more resources.

Example 4

According to an example implementation of any of examples 1-3, wherein the determining comprises determining, by a base station, a plurality of sets of physical uplink control channel (PUCCH) resources for each of a plurality of types of uplink control information.

Example 5

According to an example implementation of any of examples 1-4, wherein the first message indicating the plurality of sets of uplink control channel resources comprises information indicating one or more parameters for each set of the plurality of sets of uplink control channel resources, wherein one of the parameters of each set comprises a physical uplink control channel (PUCCH) format as either a short PUCCH or a long PUCCH.

Example 6

According to an example implementation of any of examples 1-5, wherein the type of uplink control information comprises one or more of the following: a scheduling request (SR); a channel state information (CSI) that includes one or more of a channel quality indicator (CQI), a precoding matrix indicator (PMI) and a rank indication (RI); and a hybrid automatic repeat request (HARQ) acknowledgement (ACK)-negative acknowledgement (NACK) (HARQ signaling).

Example 7

According to an example implementation of any of examples 1-6, wherein the second message also indicates one or more of the following: a channel state information (CSI) reporting mode to be used by the user device to report CSI via the selected set of uplink control channel resources; and, a hybrid automatic repeat request (HARQ) feedback format, including indicating at least one of a number of HARQ bits and a HARQ feedback bundling method, to be used by the user device to send HARQ feedback via the selected set of uplink control channel resources.

Example 8

According to an example implementation of any of examples 1-7, wherein each set of the plurality of sets of uplink control channel resources is associated with one or more of the following: a channel state information (CSI) reporting mode to be used by the user device to report CSI via the selected set of uplink control channel resources; and a hybrid automatic repeat request (HARQ) feedback format, including indicating at least one of a number of HARQ bits and a HARQ feedback bundling method, to be used by the user device to send HARQ feedback via the selected set of uplink control channel resources.

Example 9

According to an example implementation of any of examples 1-8, wherein the first message comprises a radio resource control (RRC) message indicating one or more parameters for each of the plurality of sets of uplink control channel resources.

Example 10

According to an example implementation of any of examples 1-9, wherein each of the plurality of sets of uplink control channel resources comprises at least one of: persistent or semi-persistent physical uplink control channel (PUCCH) resources; and periodic PUCCH resources.

Example 11

According to an example implementation of any of examples 1-10, wherein the first message indicates one or more parameters for each of the plurality of sets of uplink control channel resources, including one or more of the following parameters: a PUCCH (physical uplink control channel) type as either a short PUCCH or a long PUCCH; a number of physical resource blocks (PRBs); an indication of a starting physical resource block; an indication of a resource within PRBs; a periodicity and slot offset; a duration; a channel state information (CSI) reporting mode; and a maximum payload.

Example 12

According to an example implementation of any of examples 1-11, wherein the second message comprises a media access control (MAC) control element provided via a physical downlink shared channel (PDSCH).

Example 13

According to an example implementation of any of examples 1-12, wherein the first message further indicates a default set of uplink control channel resources of the plurality of sets of uplink control channel resources, wherein the default set of uplink control channel resources is to be used for uplink transmission of the type of uplink control information from the user device to the base station before the user device receives the second message; wherein the method further comprises: receiving, by the base station from the user device, uplink control information via the default set of uplink control channel resources before the user device has received the second message that indicates the selected set of uplink control channel resources.

Example 14

According to an example implementation of any of examples 1-13, wherein the selecting is performed by the base station based on a network condition.

Example 15

According to an example implementation of any of examples 1-14, wherein the selecting is performed by the base station based on at least one of the following: a radio channel condition between the base station and the user device; an amount of data in a buffer of the base station for transmission to the user device; and a number of active user devices in a cell or network.

Example 16

According to an example implementation of any of examples 1-15, further comprising: detecting, by the base station, a network condition; wherein the selecting comprises: selecting, by the base station based on the detected network condition, one set of the plurality of sets of uplink control channel resources in order to dynamically adapt, based on the detected network condition, the selected set of uplink control channel resources used by the user device for uplink transmission of uplink control information to the base station.

Example 17

According to an example implementation of any of examples 1-16, wherein the type of uplink control information comprises hybrid automatic repeat request (HARQ) acknowledgement (ACK)-negative acknowledgement (NACK) (HARQ signaling); wherein the method further comprises: sending, by the base station to the user device, downlink control information indicating a selected resource within the selected set of uplink control channel resources for the uplink transmission of the HARQ signaling.

Example 18

Figure 7:
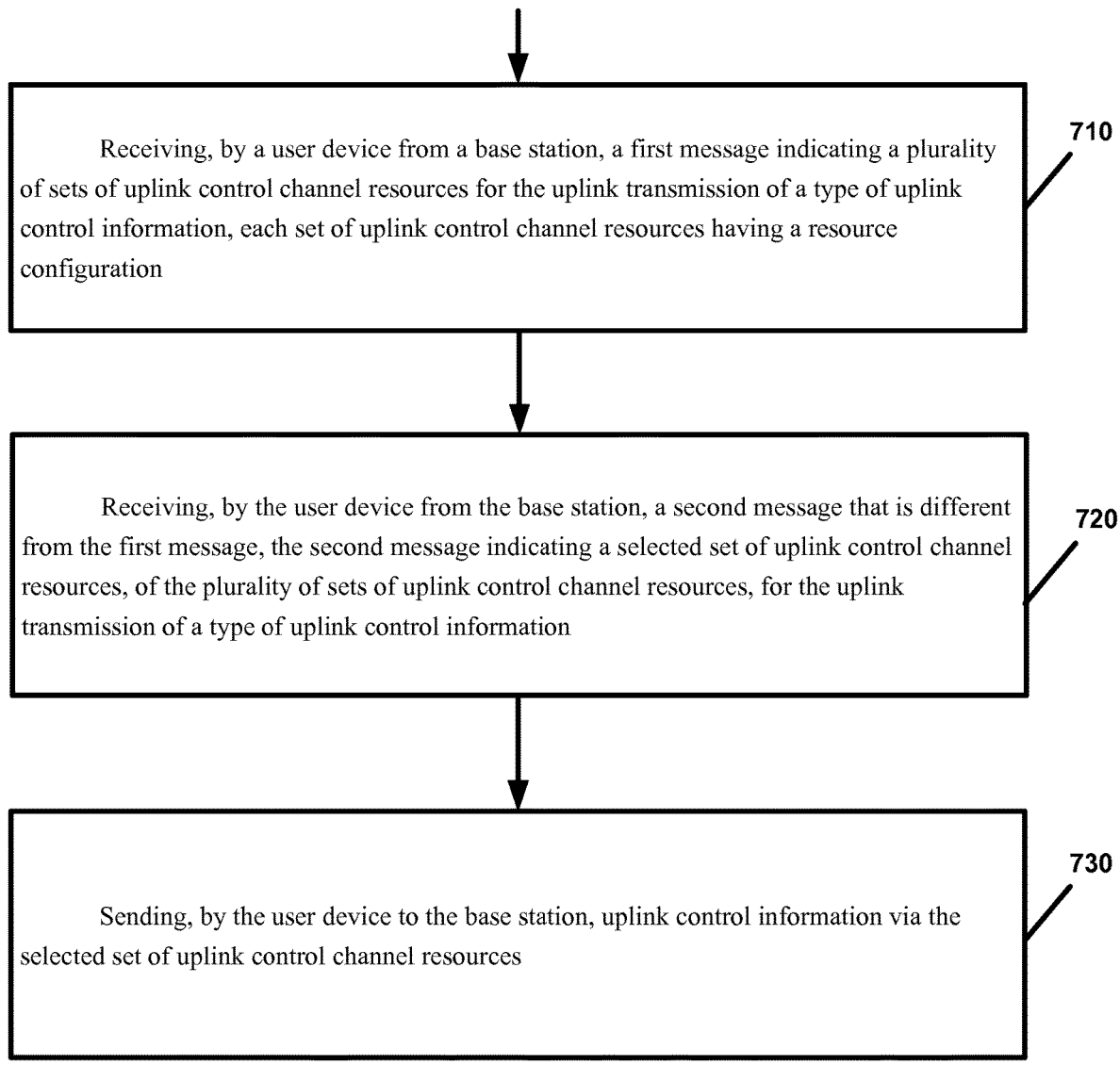
FIG. 7 is a flow chart illustrating operation of a user device (UE) according to an example implementation.

FIG. 7 is a flow chart illustrating operation of a user device (UE) according to an example implementation. Operation 710 includes receiving, by a user device from a base station, a first message indicating a plurality of sets of uplink control channel resources for the uplink transmission of a type of uplink control information, each set of uplink control channel resources having a resource configuration. Operation 720 includes receiving, by the user device from the base station, a second message that is different from the first message, the second message indicating a selected set of uplink control channel resources, of the plurality of sets of uplink control channel resources, for the uplink transmission of a type of uplink control information. And, operation 730 includes sending, by the user device to the base station, uplink control information via the selected set of uplink control channel resources.

Example 19

According to an example implementation of example 18, wherein each set of uplink control channel resources has a different resource configuration.

Example 20

According to an example implementation of any of examples 18-19, wherein each set of the plurality sets of uplink control channel resources includes one or more resources.

Example 21

According to an example implementation of any of examples 18-20, wherein the plurality of sets of uplink control channel resources comprises a plurality of sets of physical uplink control channel (PUCCH) resources for each of a plurality of types of uplink control information.

Example 22

According to an example implementation of any of examples 18-21, wherein the first message indicating the plurality of sets of uplink control channel resources comprises a first message indicating one or more parameters for each set of the plurality of sets of uplink control channel resources, wherein one of the parameters of each set comprises a physical uplink control channel (PUCCH) format as either a short PUCCH or a long PUCCH.

Example 23

According to an example implementation of any of examples 18-22, wherein the type of uplink control information comprises one or more of the following: a scheduling request (SR); a channel state information (CSI) that includes one or more of a channel quality indicator (CQI), a precoding matrix indicator (PMI) and a rank indication (RI); and a hybrid automatic repeat request (HARQ) acknowledgement (ACK)-negative acknowledgement (NACK) (HARQ signaling).

Example 24

According to an example implementation of any of examples 18-23, wherein the second message also indicates one or more of the following: a channel state information (CSI) reporting mode to be used by the user device to report CSI via the selected set of uplink control channel resources; and, a hybrid automatic repeat request (HARQ) feedback format, including indicating at least one of a number of HARQ bits and a HARQ feedback bundling method, to be used by the user device to send HARQ feedback via the selected set of uplink control channel resources.

Example 25

According to an example implementation of any of examples 18-24, wherein each set of the plurality of sets of uplink control channel resources is associated with one or more of the following: a channel state information (CSI) reporting mode to be used by the user device to report CSI via the selected set of uplink control channel resources; a hybrid automatic repeat request (HARQ) feedback format, including indicating at least one of a number of HARQ bits and a HARQ feedback bundling method, to be used by the user device to send HARQ feedback via the selected set of uplink control channel resources.

Example 26

According to an example implementation of any of examples 18-25, wherein the first message comprises a radio resource control (RRC) message indicating one or more parameters for each of the plurality of sets of uplink control channel resources.

Example 27

According to an example implementation of any of examples 18-26, wherein each of the plurality of sets of uplink control channel resources comprises at least one of: persistent or semi-persistent physical uplink control channel (PUCCH) resources; and periodic PUCCH resources.

Example 28

According to an example implementation of any of examples 18-27, wherein the first message indicates one or more parameters for each of the plurality of sets of uplink control channel resources, including one or more of the following parameters: a PUCCH (physical uplink control channel) type as either a short PUCCH or a long PUCCH; a number of physical resource blocks (PRBs); an indication of a starting physical resource block; an indication of a resource within PRBs; a periodicity and slot offset; a duration; a channel state information (CSI) reporting mode; and a maximum payload.

Example 29

According to an example implementation of any of examples 18-28, wherein the second message comprises a media access control (MAC) control element provided via a physical downlink shared channel (PDSCH).

Example 30

According to an example implementation of any of examples 18-29, wherein the first message further indicates a default set of uplink control channel resources of the plurality of sets of uplink control channel resources, wherein the default set of uplink control channel resources is to be used for uplink transmission of the type of uplink control information from the user device to the base station before the user device receives the second message; wherein the method further comprises: sending, by the user device to the base station, uplink control information via the default set of uplink control channel resources before the user device has received the second message that indicates the selected set of uplink control channel resources.

Example 31

According to an example implementation of any of examples 18-30, wherein the selecting is performed by the based on a network condition, so that the configuration of the selected set of uplink control channel resources is dynamically adjusted by the base station based on the network condition.

Example 32

According to an example implementation of any of examples 18-31, wherein the network condition comprises at least one of the following: a radio channel condition between the base station and the user device; an amount of data in a buffer of the base station for transmission to the user device; and a number of active user devices in a cell or network.

Example 33

According to an example implementation of any of examples 18-32, wherein the type of uplink control information comprises hybrid automatic repeat request (HARQ) acknowledgement (ACK)-negative acknowledgement (NACK) (HARQ signaling); wherein the method further comprises: receiving, by the user device from the base station, downlink control information indicating a selected resource within the selected set of uplink control channel resources for the uplink transmission of the HARQ signaling.

Example 34

An apparatus comprising means for performing a method of any of examples 1-33.

Example 35

An apparatus comprising at least one processor and at least one memory including computer instructions that, when executed by the at least one processor, cause the apparatus to perform a method of any of examples 1-33.

Example 36

An apparatus comprising a computer program product including a non-transitory computer-readable storage medium and storing executable code that, when executed by at least one data processing apparatus, is configured to cause the at least one data processing apparatus to perform a method of any of examples 1-33.

Figure 8:
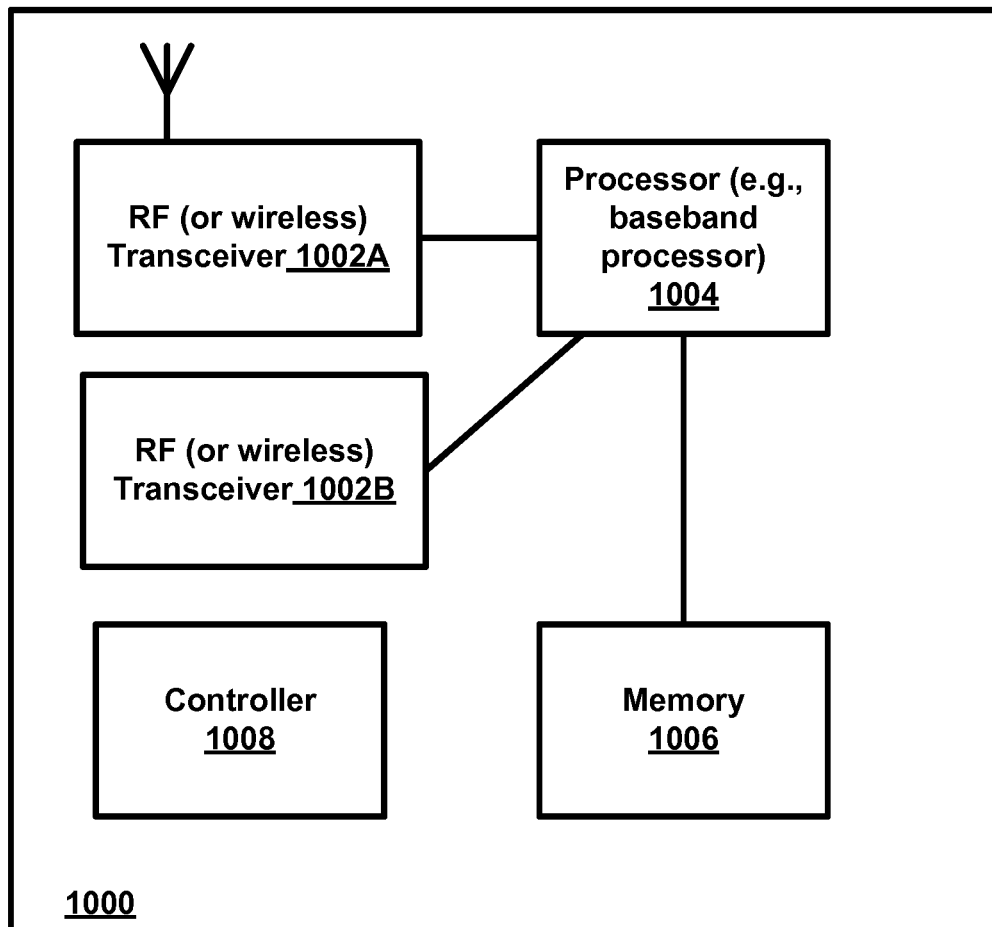
FIG. 8 is a block diagram of a node or wireless station (e.g., base station/access point or mobile station/user device) according to an example implementation.

FIG. 8 is a block diagram of a wireless station (e.g., AP, BS, relay node, eNB, UE or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 8, a controller (or processor) 1008 may execute software and instructions, and may provide overall control for the station 1000, and may provide control for other systems not shown in FIG. 8, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

LIST OF SOME EXAMPLE ABBREVIATIONS

| ACK | Acknowledgement |
| CE | Control Element |
| CS | Cyclic shift |
| CSI | Channel State Information |
| gNB | NR (new radio/5G) Base Station (BS) |
| HARQ | Hybrid Auto Repeat reQuest |
| LTE | Long Term Evolution |
| MAC | Medium Access Control |
| NACK | Negative ACK |
| NR | New Radio (5G) |
| PDSCH | Physical Downlink Shared Channel |
| PRB | Physical Resource Block |
| PUCCH | Physical Uplink Control Channel |
| PUSCH | Physical Uplink Control Channel |
| RRC | Radio Resource Control |
| SR | Scheduling Request |
| UE | User Equipment |

What is claimed is:

1. An apparatus comprising:
   at least one processor; and
   at least one non-transitory memory including computer program code;
   the at least one non-transitory memory and the computer program code configured to, with the at the at least one processor, cause the apparatus at least to:
      receive a first message indicating a plurality of sets of uplink control channel resources for uplink transmission of channel state information, each set of uplink control channel resources having a resource configuration;
      receive a second message that is different from the first message, the second message indicating a selected set of uplink control channel resources, of the plurality of sets of uplink control channel resources, for the uplink transmission of channel state information; and
      send channel state information via the selected set of uplink control channel resources;
   wherein the first message comprises a radio resource control message indicating one or more parameters for each of the plurality of sets of uplink control channel resources; and
   wherein the second message comprises a media access control control element provided via a physical downlink shared channel.

2. The apparatus of claim 1, wherein each set of uplink control channel resources has a different resource configuration.

3. The apparatus of claim 1, wherein each set of the plurality of sets of uplink control channel resources includes one or more resources.

4. The apparatus of claim 1, wherein the first message indicating the plurality of sets of uplink control channel resources comprises information indicating one or more parameters for each set of the plurality of sets of uplink control channel resources, wherein one of the parameters of each set comprises a physical uplink control channel format as either a short physical uplink control channel or a long physical uplink control channel.

5. The apparatus of claim 1, wherein each of the plurality of sets of uplink control channel resources comprises at least one of:
   persistent or semi-persistent physical uplink control channel resources.

6. An apparatus comprising
   at least one processor; and
   at least one non-transitory memory including computer program code;
   the at least one memory and the computer program code configured to, with the at the at least one processor, cause the apparatus at least to:
      determine a plurality of sets of uplink control channel resources for uplink transmission of channel state information, each set of uplink control channel resources having a resource configuration;
      send a first message indicating the plurality of sets of uplink control channel resources;
      select one set of the plurality of sets of uplink control channel resources;
      send a second message that is different from the first message, the second message indicating the selected set of uplink control channel resources for uplink transmission of channel state information;
   receive channel state information via the selected set of uplink control channel resources;
   wherein the first message comprises a radio resource control (RRC) message indicating one or more parameters for each of the plurality of sets of uplink control channel resources; and
   wherein the second message comprises a media access control (MAC) control element provided via a physical downlink shared channel (PDSCH).

7. A method comprising:
   receiving a first message indicating a plurality of sets of uplink control channel resources for uplink transmission of channel state information, each set of uplink control channel resources having a resource configuration;
   receiving a second message that is different from the first message, the second message indicating a selected set of uplink control channel resources, of the plurality of sets of uplink control channel resources, for uplink transmission of channel state information;

sending channel state information via the selected set of uplink control channel resources;

wherein the first message comprises a radio resource control (RRC) message indicating one or more parameters for each of the plurality of sets of uplink control channel resources; and wherein the second message comprises a media access control (MAC) control element provided via a physical downlink shared channel.

8. A method comprising:

determining a plurality of sets of uplink control channel resources for uplink transmission of channel state information, each set of uplink control channel resources having a resource configuration;

sending a first message indicating the plurality of sets of uplink control channel resources;

selecting one set of the plurality of sets of uplink control channel resources;

sending a second message that is different from the first message, the second message indicating the selected set of uplink control channel resources for uplink transmission of channel state information;

receiving channel state information via the selected set of uplink control channel resources;

wherein the first message comprises a radio resource control (RRC) message indicating one or more parameters for each of the plurality of sets of uplink control channel resources; and wherein the second message comprises a media access control (MAC) control element provided via a physical downlink shared channel.

9. A computer program product including a non-transitory computer-readable storage medium and storing executable code that, when executed by at least one data processing apparatus, is configured to cause the at least one data processing apparatus to perform a method of claim 7.

10. A computer program product including a non-transitory computer-readable storage medium and storing executable code that, when executed by at least one data processing apparatus, is configured to cause the at least one data processing apparatus to perform a method of claim 8.

11. The method of claim 7, wherein each set of uplink control channel resources has a different resource configuration.

12. The methos of claim 7, wherein each set of the plurality of sets of uplink control channel resources includes one or more resources.

13. The method of claim 7, wherein the first message indicating the plurality of sets of uplink control channel resources comprises information indicating one or more parameters for each set of the plurality of sets of uplink control channel resources, wherein one of the parameters of each set comprises a physical uplink control channel format as either a short physical uplink control channel or a long physical uplink control channel.

14. The method of claim 7, wherein each of the plurality of sets of uplink control channel resources comprises at least persistent or semi-persistent physical uplink control channel resources.

15. The apparatus of claim 6, wherein each set of uplink control channel resources has a different resource configuration.

16. The apparatus of claim 6, wherein each set of the plurality of sets of uplink control channel resources includes one or more resources.

17. The apparatus of claim 6, wherein the first message indicating the plurality of sets of uplink control channel resources comprises information indicating one or more parameters for each set of the plurality of sets of uplink control channel resources, wherein one of the parameters of each set comprises a physical uplink control channel format as either a short physical uplink control channel or a long physical uplink control channel.

18. The method of claim 6, wherein each of the plurality of sets of uplink control channel resources comprises at least persistent or semi-persistent physical uplink control channel resources.

19. The method of claim 8, wherein each set of uplink control channel resources has a different resource configuration.

20. The method of claim 8, wherein each set of the plurality of sets of uplink control channel resources includes one or more resources.

21. The method of claim 8, wherein the first message indicating the plurality of sets of uplink control channel resources comprises information indicating one or more parameters for each set of the plurality of sets of uplink control channel resources, wherein one of the parameters of each set comprises a physical uplink control channel format as either a short physical uplink control channel or a long physical uplink control channel.

22. The method of claim 8, wherein each of the plurality of sets of uplink control channel resources comprises at least persistent or semi-persistent physical uplink control channel resources.

* * * * *